(12) United States Patent
Hisada et al.

(10) Patent No.: US 9,962,789 B2
(45) Date of Patent: May 8, 2018

(54) WELDING METHOD

(71) Applicant: TOYOTA JIDOSHA KABUSHIKI KAISHA, Toyota-shi, Aichi-ken (JP)

(72) Inventors: Kohei Hisada, Nagoya (JP); Toru Hioki, Miyoshi (JP); Shuichi Matsumoto, Kariya (JP); Kazuyuki Ogusu, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 15/059,897

(22) Filed: Mar. 3, 2016

(65) Prior Publication Data
US 2016/0288261 A1 Oct. 6, 2016

(30) Foreign Application Priority Data
Apr. 3, 2015 (JP) ................. 2015-076494

(51) Int. Cl.
| B23K 26/22 | (2006.01) |
| B23K 15/00 | (2006.01) |
| B23K 26/14 | (2014.01) |
| B23K 26/32 | (2014.01) |
| B23K 26/082 | (2014.01) |
| B23K 101/18 | (2006.01) |
| B23K 103/04 | (2006.01) |
| B23K 103/10 | (2006.01) |

(52) U.S. Cl.
CPC ........... *B23K 26/22* (2013.01); *B23K 15/008* (2013.01); *B23K 15/0093* (2013.01); *B23K 26/082* (2015.10); *B23K 26/1429* (2013.01); *B23K 26/32* (2013.01); *B23K 2201/18* (2013.01); *B23K 2203/04* (2013.01); *B23K 2203/10* (2013.01)

(58) Field of Classification Search
CPC ................................ B23K 26/22; B23K 15/00
USPC ............. 219/121.13, 121.14, 121.63, 121.64
See application file for complete search history.

(56) References Cited

U.S. PATENT DOCUMENTS

| 2,776,361 | A | * | 1/1957 | Essig | ..................... B23K 9/007 |
| | | | | | 219/137.71 |
| 4,229,639 | A | * | 10/1980 | Koy | ................... B23K 15/0046 |
| | | | | | 219/121.14 |
| 2005/0109740 | A1 | | 5/2005 | Becker et al. | |
| 2013/0168371 | A1* | | 7/2013 | Furusako | ............... B23K 26/22 |
| | | | | | 219/121.64 |
| 2014/0377578 | A1 | | 12/2014 | Hisada et al. | |

(Continued)

FOREIGN PATENT DOCUMENTS

| CN | 103153523 A | 6/2013 |
| DE | 103 51 779 B3 | 2/2005 |

(Continued)

*Primary Examiner* — Samuel M Heinrich
(74) *Attorney, Agent, or Firm* — Oliff PLC (57) ABSTRACT

A welding method according to the present invention is a welding method for irradiating an object to be welded including a plurality of metallic plates that are stacked on each other with a high energy beam and performing welding. The welding method includes: forming a plurality of tack weld nuggets along a virtual closed curve on a part to be welded of the object to be welded; and forming a plurality of main weld nuggets so that the main weld nuggets overlap the plurality of respective tack weld nuggets.

4 Claims, 8 Drawing Sheets (56) References Cited

U.S. PATENT DOCUMENTS

2015/0298255 A1  10/2015  Hisada et al.
2016/0236297 A1  8/2016  Hisada et al.

FOREIGN PATENT DOCUMENTS

| JP | 2001-062575 A | 3/2001 |
| JP | 2013-132686 A | 7/2013 |
| JP | 2015-205323 A | 11/2015 |
| JP | 2016-150363 A | 8/2016 |

* cited by examiner

The present inventors have found the following problem.
WELDING METHOD

INCORPORATION BY REFERENCE

This application is based upon and claims the benefit of priority from Japanese patent application No. 2015-076494, filed on Apr. 3, 2015, the disclosure of which is incorporated herein in its entirety by reference.

BACKGROUND OF THE INVENTION

1. Field of the Invention

The present invention relates to a welding method, and more specifically, to a welding method that uses a high energy beam such as a laser beam, an electron beam or an ion beam.

2. Description of Related Art

One widely used welding method for joining together a plurality of metallic plates that are stacked on each other is a welding method by laser welding, because it offers advantages such as that there is little processing distortion, high speed welding is possible, and few portions are affected by residual heat.

Japanese Unexamined Patent Application Publication No. 2001-062575 discloses a method of laser welding two metallic plates that are stacked on each other, in which a plurality of nuggets are formed along a closed curve to satisfy the nugget diameter/pitch ≥0.5.

In Japanese Unexamined Patent Application Publication No. 2001-062575, there is a problem that a deformation of an object to be welded occurs due to a heat distortion or a residual stress during a welding process. To address the deformation of the object to be welded during the welding process, a method of carrying out tack welding before carrying out main welding at the tack welded part or a vicinity thereof is known.

SUMMARY OF THE INVENTION

The present inventors have found the following problem. When main welding is carried out to make a main welded part overlap the tack welded part, the effect of suppressing the deformation of the object to be welded by the tack welded part is lost during the main welding process, which ends up with the deformation of the object to be welded being caused. On the other hand, when the vicinity of the tack welded part is main welded and the tack welded part remains even after the main welding is completed, the tack welded part, which is low in strength, peels off after the main welding is completed. Although there is no problem even when the tack welded part is peeled off, abnormal noise occurs when the tack welded part is peeled off.

The present invention has been made in view of the aforementioned discussion and aims to suppress deformation of an object to be welded after main welding is carried out and peeling of a tack welded part after the main welding is carried out.

A welding method according to the present invention is a welding method for irradiating an object to be welded including a plurality of metallic plates that are stacked on each other with a high energy beam and performing welding, the method including the processes of: forming a plurality of tack weld nuggets along a virtual closed curve on a part to be welded of the object to be welded; and forming a plurality of main weld nuggets so that the main weld nuggets overlap the plurality of respective tack weld nuggets.

In the welding method according to the present invention, a plurality of tack weld nuggets are provided along the virtual closed curve on the part to be welded. Therefore, even when the main weld nuggets are formed so that the main weld nuggets overlap the tack weld nuggets, the deformation of the object to be welded can be suppressed due to the presence of other tack weld nuggets and the main weld nugget that has already been formed. Further, the plurality of main weld nuggets are formed so that the plurality of main weld nuggets overlap the plurality of respective tack weld nuggets. Therefore, there is no tack weld nugget left after the main welding is carried out. Even if there is a tack weld nugget left, the main weld nugget that is formed to overlap the tack weld nugget prevents the remaining tack weld nugget from being peeled off. It is therefore possible to suppress deformation of the object to be welded when the main welding is carried out and peeling of the tack welded part after the main welding is carried out.

Further, in the welding method according to the present invention, it is preferable that the plurality of main weld nuggets be formed so that the plurality of main weld nuggets enclose the plurality of respective tack weld nuggets. Since there is no tack welded part left after the main welding is completed, it is possible to substantially prevent the tack welded part after the main welding is carried out from being peeled off.

Further, in the welding method according to the present invention, a laser beam is preferably used as the high energy beam.

According to the present invention, it is possible to suppress deformation of an object to be welded after main welding is carried out and peeling of a tack welded part after the main welding is carried out.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, with reference to the drawings, specific embodiments of the present invention will be described. However, the present invention is not limited to the following embodiments. For the clarification of the description, the following description and the drawings are simplified as appropriate.

First Embodiment

Figure 1:
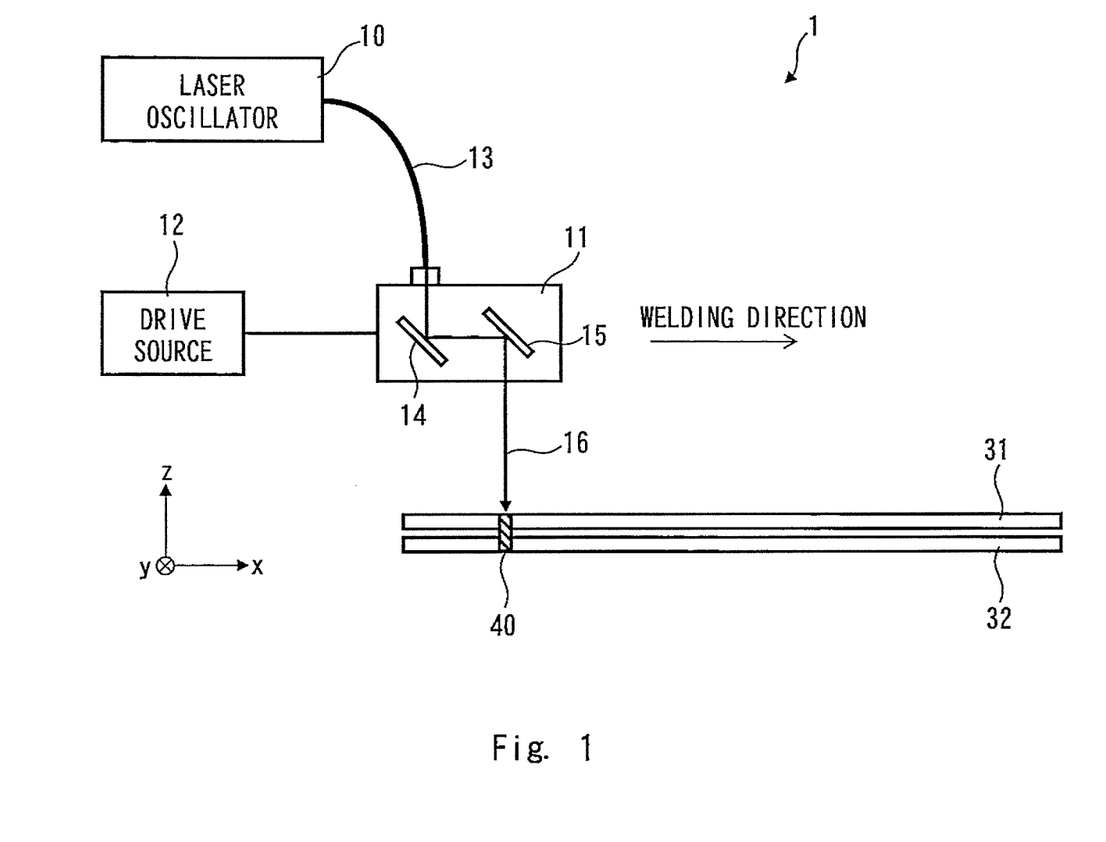
FIG. 1 is a side view showing one example of a laser welding apparatus to carry out a welding method according to a first embodiment.
Figure 2:
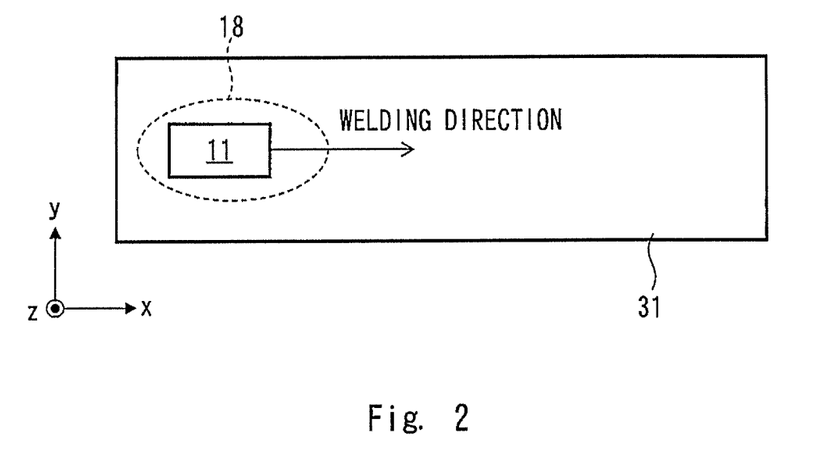
FIG. 2 is a plan view for describing a basic operation of the laser welding apparatus.

First, with reference to FIGS. 1 to 3D, a laser welding apparatus to carry out a welding method according to a first embodiment will be described. FIG. 1 is a side view showing one example of the laser welding apparatus to carry out the welding method according to the first embodiment. FIG. 2 is a plan view for describing a basic operation of the laser welding apparatus. FIGS. 3A to 3D are cross-sectional views for describing the basic operation of the laser welding apparatus.

The right-handed xyz coordinates shown in FIGS. 1 to 3D etc. are illustrated for the sake of convenience, in particular, for explaining the positional relation among components throughout the drawings. In the drawings, the xy-plane forms a horizontal plane and the z-axis direction is the vertical direction, with the positive direction on the z-axis being the vertically upward direction.

As shown in FIG. 1, a laser welding apparatus 1 includes a laser oscillator 10, a scanning means 11, and a drive source 12.

The laser oscillator 10 generates a laser beam. The laser beam that is generated is directed to the scanning means 11 using a fiber optic cable 13. The laser beam may be, for example, a carbon dioxide laser, a YAG laser, or a fiber laser.

The scanning means 11 scans a laser beam 16 that is directed from the laser oscillator 10 via the fiber optic cable 13 in a scanning range 18 shown in FIG. 2 and emits the laser beam 16 to a metallic plate 31, which is an object to be welded. In this way, a part to be welded 40 in which two metallic plates 31 and 32 that are stacked on each other are joined together is formed.

The scanning means 11 includes mirrors 14 and 15, each being rotatable about one rotation axis. For example, the mirror 14 scans the laser beam 16 in the x-axis direction and the mirror 15 scans the laser beam 16 in the y-axis direction. The mirrors 14 and 15 can be formed, for example, of galvano mirrors.

The scanning means 11 can be moved in a desired direction (x-axis direction, y-axis direction, and z-axis direction) by the drive source 12 such as a robot, for example.

While the scanning means 11 is formed of two mirrors 14 and 15 in FIG. 1, it may be formed of one mirror that is rotatable in two axial directions.

With reference next to FIGS. 2 and 3A to 3D, a basic operation of the laser welding apparatus 1 will be described. FIGS. 2 and 3A to 3D exemplify a case in which the two metallic plates 31 and 32 are welded and joined together as the objects to be welded. While the two metallic plates 31 and 32, which are the objects to be welded, are arranged such that they are spaced apart from each other in FIGS. 3A to 3D, the two metallic plates 31 and 32 may be arranged such that they contact each other.

As shown in the plan view of FIG. 2, when the metallic plates 31 and 32 are welded together, the scanning means 11 is moved in a welding direction shown by the arrow. The welding direction is a direction in which the metallic plates 31 and 32 are welded together. In other words, the welding direction is the direction in which parts to be welded 41 and 42 shown in FIGS. 3A to 3D are formed. At this time, the scanning range 18 of the laser beam 16 is moved when the scanning means 11 moves. The scanning means 11 may move in the welding direction at a constant speed (that is, continuously) or in a stepwise manner (that is, discontinuously).

Figure 3A:
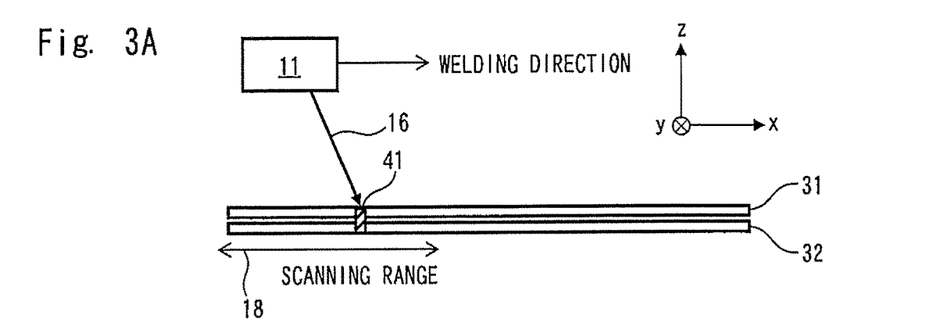
FIGS. 3A to 3D are cross-sectional views for describing the basic operation of the laser welding apparatus.
Figure 3B:
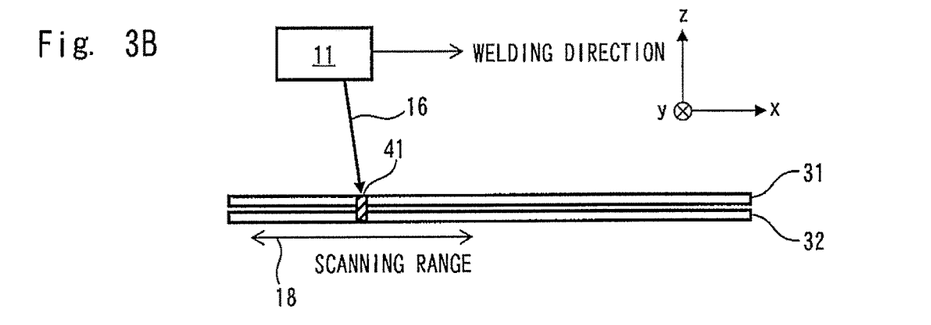
Figure 3C:
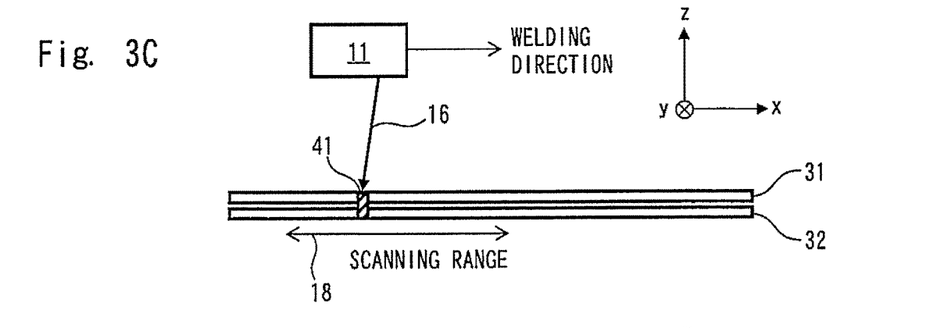

Further, as shown in FIG. 3A, when the metallic plates 31 and 32 are welded together, the scanning means 11 irradiates the part to be welded 41 with the laser beam 16. The scanning means 11 keeps moving in the welding direction. Therefore, as shown in FIGS. 3B and 3C, the scanning means 11 scans the laser beam 16 and causes the part to be welded 41 to be irradiated with the laser beam 16. The moving speed of the scanning means 11 is set to a speed so that the part to be welded 41 falls within the scanning range 18 of the scanning means 11 from the start of welding of the part to be welded 41 to the end of the welding thereof.

Figure 3D:
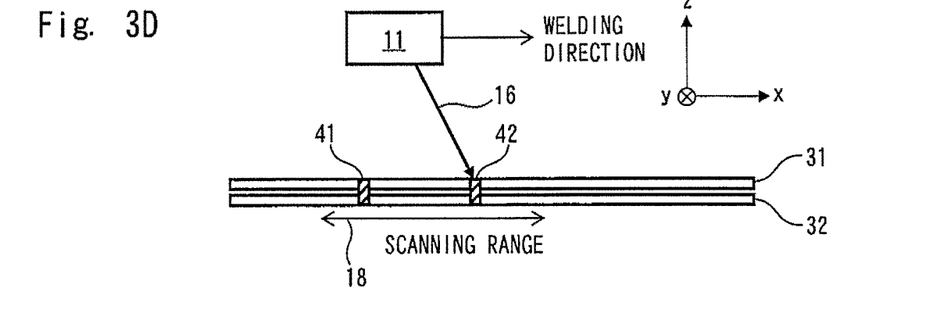

After that, as shown in FIG. 3D, the scanning means 11 emits the laser beam 16 to the next part to be welded 42. In this way, the laser welding apparatus 1 is able to weld predetermined parts of the metallic plates 31 and 32 by scanning the laser beam 16 by the scanning means 11 while moving the scanning means 11 by the drive source 12. When the above welding method is used, the parts to be welded 41 and 42 (the part to be welded 40 in FIG. 1) become discrete. As a matter of course, the number of plurality of metallic plates, which are the objects to be welded, may be three or larger.

Figure 4A:
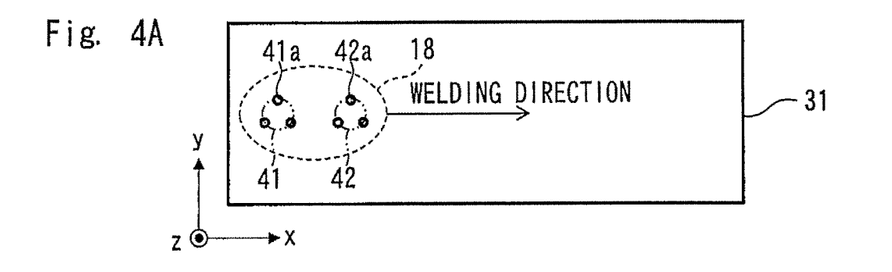
FIGS. 4A to 4D are diagrams for describing the welding method according to the first embodiment.
Figure 4B:
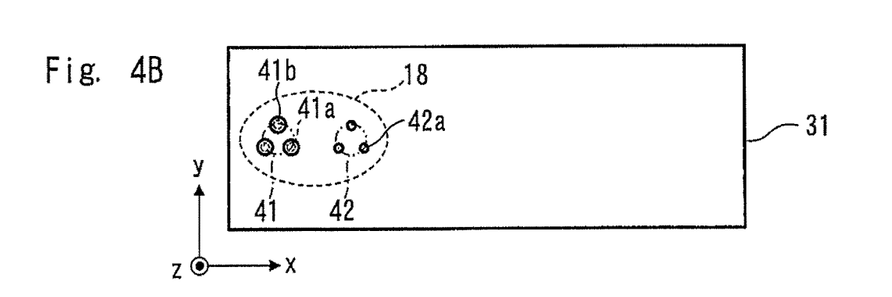
Figure 4C:
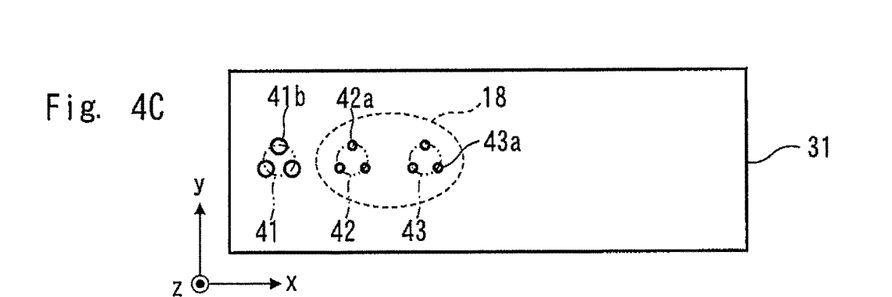
Figure 4D:
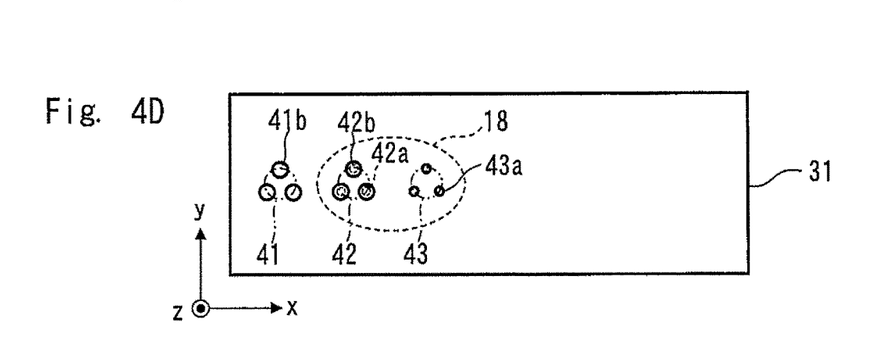
Figure 5A:
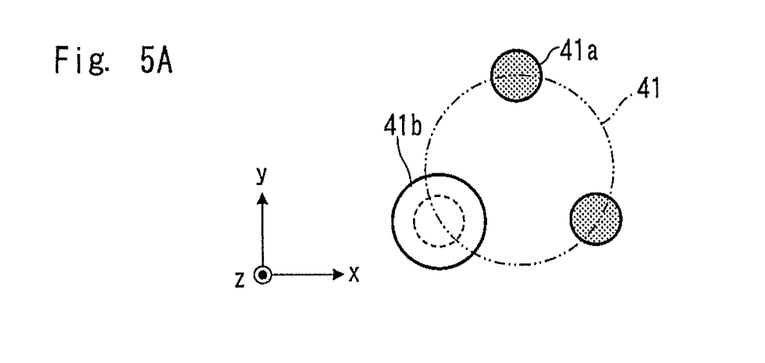
FIGS. 5A to 5C are diagrams for describing the welding method according to the first embodiment.
Figure 5B:
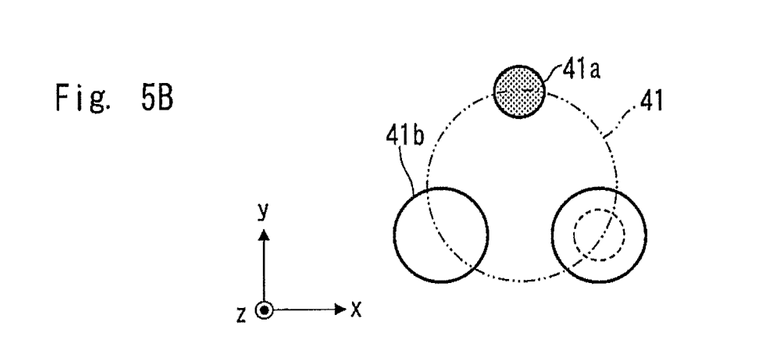
Figure 5C:
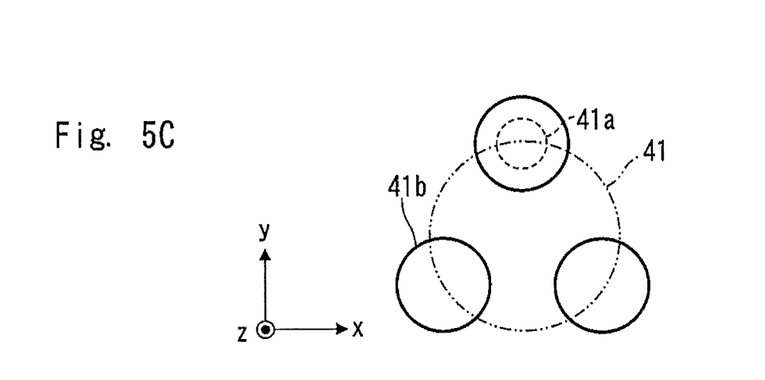

With reference next to FIGS. 4A to 4D and 5A to 5C, a welding method according to this embodiment will be described. FIGS. 4A to 4D and 5A to 5C are diagrams for describing the welding method according to the first embodiment. The welding method according to this embodiment can be executed using the laser welding apparatus 1 described above. FIGS. 4A to 4D each show a plan view of the metallic plate 31 irradiated with the laser beam 16. Further, in FIGS. 5A to 5C, the main welding process of the part to be welded 41 shown in FIG. 4B is further divided into several processes. In FIGS. 4A to 4D, only the scanning range 18 of the scanning means 11 is shown and the scanning means 11 is omitted. In FIGS. 5A to 5C, only the part to be welded 41 is shown.

The welding method according to this embodiment is a laser welding method to weld the plurality of metallic plates 31 and 32 by emitting the laser beam 16 scanned by the scanning means 11 to the plurality of metallic plates 31 and 32, which are the objects to be welded, while moving the scanning means 11 that scans the laser beam 16 directed from the laser oscillator 10.

As shown in FIG. 4A, first, the part to be welded 41 is irradiated with the laser beam 16 to perform tack welding. Specifically, a plurality of tack weld nuggets 41a are formed in the part to be welded 41. In the example shown in FIG. 4A, three tack weld nuggets 41a are formed. The three tack weld nuggets 41a may be formed in any order. The same is applicable to the other parts to be welded. The term "tack welding" means temporary welding to suppress the metallic plates 31 and 32 from being deformed due to a heat distortion or residual stress during the main welding process. The joining strength in the tack welding is smaller than that in the main welding.

Next, the part to be welded 42 is irradiated with the laser beam 16 to perform tack welding. That is, three tack weld nuggets 42a are formed in the part to be welded 42.

Next, as shown in FIG. 4B, the part to be welded 41 is irradiated with the laser beam 16 to perform main welding. Specifically, a plurality of main weld nuggets 41b are formed so that the main weld nuggets 41b overlap the plurality of respective tack weld nuggets 41a. In the example shown in FIG. 4B, three main weld nuggets 41b are formed so that the main weld nuggets 41b overlap three respective tack weld nuggets 41a. The term "main welding" means welding to securely join the metallic plates 31 and 32 to each other. For example, the time during which the laser beam 16 is emitted in the main welding process is longer than the time during which the laser beam 16 is emitted in the tack welding process.

Now, with reference to FIGS. 5A to 5C, the main welding process of the part to be welded 41 shown in FIG. 4B will be described in further detail.

As shown in FIG. 5A, when the part to be welded 41 is main welded, the first main weld nugget 41b is formed so that the first main weld nugget 41b overlaps the first tack weld nugget 41a. In the example shown in FIG. 5A, the first main weld nugget 41b is formed so that the first main weld nugget 41b overlaps the tack weld nugget 41a positioned on the left side in the lower stage in the part to be welded 41 shown in FIG. 5A. The effect of suppressing the deformation of the object to be welded by the first tack weld nugget 41a shown by the dashed line is lost when the first main weld nugget 41b is formed, in the main welding process. However, due to the presence of the two remaining tack weld nuggets 41a, it is possible to suppress the deformation of the object to be welded when the first main weld nugget 41b is formed.

Next, as shown in FIG. 5B, the second main weld nugget 41b is formed so that the second main weld nugget 41b overlaps the second tack weld nugget 41a. In the example shown in FIG. 5B, the second main weld nugget 41b is formed so that the second main weld nugget 41b overlaps the tack weld nugget 41a positioned on the right side in the lower stage in the part to be welded 41 shown in FIG. 5B. The effect of suppressing the deformation of the object to be welded by the second tack weld nugget 41a shown by the dashed line is lost when the second main weld nugget 41b is formed, in the main welding process. However, due to the presence of the one remaining tack weld nugget 41a and the first main weld nugget 41b, the deformation of the object to be welded can be suppressed when the second main weld nugget 41b is formed. When the heat conductivity of the metallic plates 31 and 32, which are the objects to be welded, is as high as that of an aluminum alloy plate, the first main weld nugget 41b is quickly solidified, whereby an enhanced effect of suppressing the deformation of the object to be welded by the first main weld nugget 41b can be obtained.

Next, as shown in FIG. 5C, the third main weld nugget 41b is formed so that the third main weld nugget 41b overlaps the third tack weld nugget 41a. In the example shown in FIG. 5C, the third main weld nugget 41b is formed so that the third main weld nugget 41b overlaps the tack weld nugget 41a positioned in the upper stage in the part to be welded 41 shown in FIG. 5C. The effect of suppressing the deformation of the object to be welded by the third tack weld nugget 41a shown by the dashed line is lost when the third main weld nugget 41b is formed, in the main welding process. However, due to the presence of the first and second main weld nuggets 41b, the deformation of the object to be welded can be suppressed when the third main weld nugget 41b is formed.

The three main weld nuggets 41b may be formed in any order.

As described above, the plurality of tack weld nuggets 41a are provided along the virtual closed curve in the part to be welded 41. Therefore, even when the main weld nugget 41b is formed so that the main weld nugget 41b overlaps one weld nugget 41a, it is possible to suppress the deformation of the object to be welded due to the presence of the other tack weld nugget 41a and the main weld nugget 41b that has already been formed.

Further, the plurality of main weld nuggets 41b are formed so that the respective main weld nuggets 41b overlap the respective tack weld nuggets 41a. As shown in FIGS. 5A to 5C, when the respective main weld nuggets 41b enclose the respective tack weld nuggets 41a, the tack weld nuggets 41a do not remain after the main welding is completed. Therefore, peeling of the tack welded part after the main welding is completed does not occur.

On the other hand, even when a part of the tack weld nugget 41a extends beyond the main weld nugget 41b that is formed to overlap the tack weld nugget 41a and remains after the main welding, the peeling of the remaining tack weld nugget is suppressed by the main weld nugget 41b that is formed to overlap the tack weld nugget 41a. By making the closed curve that passes the center of the tack weld nuggets 41a be inside the closed curve that passes the center of the main weld nuggets 41b, the peeling of the tack welded part after the main welding process can be further suppressed.

As described above, in the welding method according to this embodiment, it is possible to suppress deformation of the object to be welded when the main welding is carried out and to suppress peeling of the tack welded part after the main welding is carried out.

Referring back to FIGS. 4A to 4C, the description of the welding method according to this embodiment will be continued.

Next, as shown in FIG. 4C, a part to be welded 43 is irradiated with the laser beam 16 to perform tack welding. That is, three tack weld nuggets 43a are formed in the part to be welded 43.

After that, as shown in FIG. 4D, the scanning means 11 causes the part to be welded 42 to be irradiated with the laser beam 16 to perform main welding. That is, three main weld nuggets 42b are formed so that the main weld nuggets 42b overlap the three respective tack weld nuggets 42a.

By repeating a similar operation, the metallic plates 31 and 32 can be welded.

Figure 6:
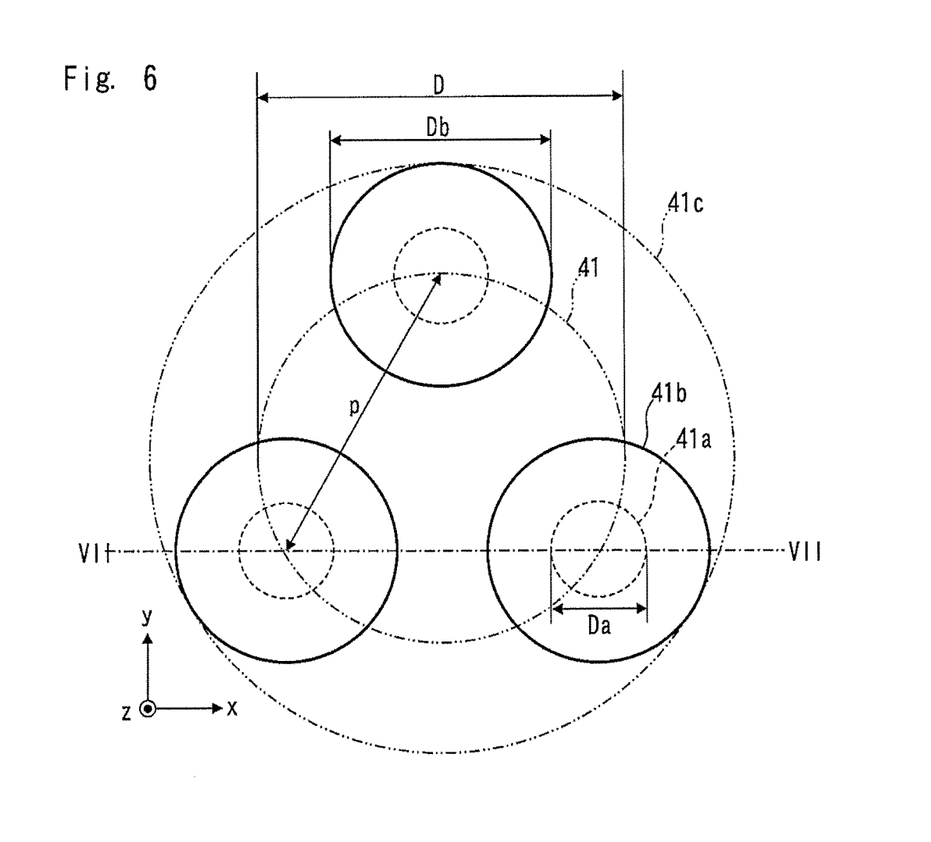
FIG. 6 is an enlarged plan view of a part to be welded 41.
Figure 7:
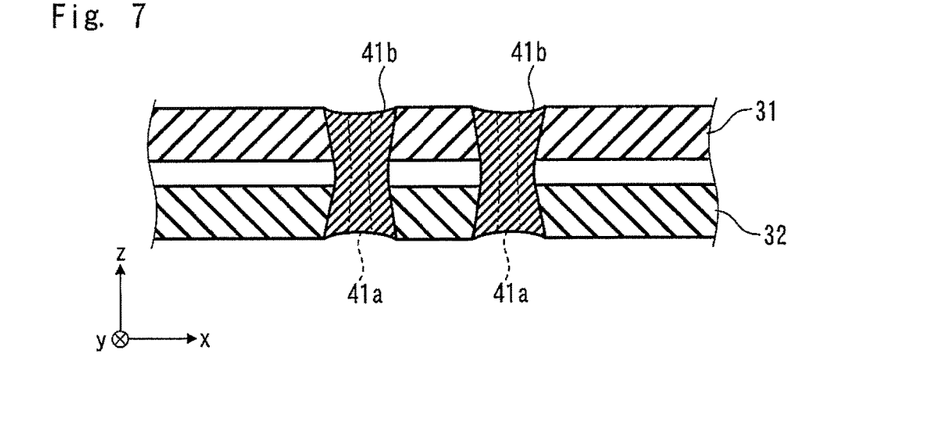
FIG. 7 is a cross-sectional view taken along the line VII-VII of FIG. 6.

With reference to FIGS. 6 and 7, the detailed configuration of the part to be welded 41 including the plurality of main weld nuggets 41b formed to overlap the plurality of respective tack weld nuggets 41a will be described. FIG. 6 is an enlarged plan view of the part to be welded 41. FIG. 7 is a cross-sectional view taken along the line VII-VII of FIG. 6.

As shown in FIG. 6, in the welding method according to this embodiment, the plurality of tack weld nuggets 41a are formed along the virtual closed curve shown by an alternate long and two short dashed line showing the part to be welded 41. After that, the plurality of main weld nuggets 41b are formed so that the main weld nuggets 41b overlap the respective tack weld nuggets 41a.

In the example shown in FIG. 6, three tack weld nuggets 41a having the circular shape of a diameter Da are formed at equal intervals along the virtual curve having the circular shape of a diameter D (that is, the part to be welded 41) and then three main weld nuggets 41b having the circular shape of a diameter Db are formed so that the main weld nuggets 41b overlap the respective tack weld nuggets 41a. There is no tack weld nugget 41a left after the main weld nuggets 41b are formed. Therefore, the tack weld nuggets 41a are shown by the dashed lines.

The number of tack weld nuggets 41a and the number of main weld nuggets 41b are not particularly limited. Further, the number of main weld nuggets 41b and the number of tack weld nuggets 41a may not be the same and the number of main weld nuggets 41b may be larger than the number of tack weld nuggets 41a. That is, the tack weld nuggets 41a are not necessarily formed in all the positions where the main weld nuggets 41b are formed.

Further, the shape of the tack weld nuggets 41a and the main weld nuggets 41b is not limited to the circular shape and may be, for example, oblong or polygonal shaped.

Further, the shape of the virtual closed curve where the tack weld nuggets 41a and the main weld nuggets 41b are arranged (virtual closed curve shown by the alternate long and two short dashed lines showing the part to be welded 41 in FIG. 6) is not limited to the circular shape and may also be, for example, oblong, a curve having a desired shape, or polygonal shaped.

Further, while the diameter Da of the tack weld nugget 41a is generally smaller than that of the main weld nugget 41b as shown in FIG. 6, the diameter Da of the tack weld nugget 41a may be larger than that of the main weld nugget 41b. As the diameter Da of the tack weld nugget 41a becomes smaller, the heat distortion when the tack weld nugget 41a is formed can be reduced. Further, the tack welding time can be reduced, which improves the production efficiency and the energy efficiency. On the other hand, the effect of suppressing the deformation of the object to be welded in the main welding process deteriorates.

When the diameter Da of the tack weld nugget 41a is larger than the diameter Db of the main weld nugget 41b, a part of the tack weld nugget 41a extends beyond the main weld nugget 41b that is formed to overlap the tack weld nugget 41a and remains after the main welding. Even in such a case, the peeling of the remaining tack weld nugget is suppressed by the main weld nugget 41b formed to overlap the tack weld nugget 41a.

Regarding the strength characteristic such as the peeling strength, the diameter Db of the main weld nugget 41b with respect to a pitch p, which is the distance between the adjacent main weld nuggets 41b, preferably satisfies $\frac{1}{2} < Db/p \leq 1$. When the main weld nugget 41b has a circular shape, the diameter Db of the main weld nugget 41b is a diameter of the circle. On the other hand, when the main weld nugget 41b has an elliptical shape, the diameter Db may be, for example, the length of the long axis or it may be an average value of the length of the long axis and the length of the short axis.

When $Db/p \leq \frac{1}{2}$, the diameter Db of the main weld nugget 41b is small with respect to the pitch p, so the main weld nuggets 41b are separated from one another. Therefore, regarding the strength characteristic, the main weld nuggets 41b each fracture separately when a load that exceeds the strength of each single main weld nugget 41b is applied without the plurality of main weld nuggets 41b affecting one another. Therefore, the strength becomes lower than that of one nugget surrounded by a circle 41c having the diameter (D+Db).

Further, when $1 < Db/p$, the diameter Db of the main weld nugget 41b is too large for the pitch p, so the diameters Db of the adjacent main weld nuggets 41b end up overlapping with each other. Thus, the plurality of main weld nuggets 41b are integrated and fracturing occurs all at once along a boundary between the weld (the plurality of main weld nuggets 41b) and the base material (the metallic plates 31 and 32). That is, the strength becomes equal to that of one nugget surrounded by the circle 41c having the diameter (D+Db).

On the other hand, when $\frac{1}{2} < Db/p \leq 1$, the adjacent weld nuggets 41b are adequately separated from each another. That is, the base material (the metallic plates 31 and 32) is provided between the adjacent main weld nuggets 41b, whereby the main weld nuggets 41b are inhibited from becoming integrated and fracturing all at once. Moreover, the main weld nuggets 41b are also inhibited from fracturing separately. Therefore, the strength higher than that of one nugget surrounded by the circle 41c having the diameter (D+Db) can be obtained.

Further, as shown in FIGS. 4A to 4D, it is preferable that the part to be welded be main welded while keeping the parts to be welded on both sides thereof fixed. Specifically, as shown in FIG. 4C, when the part to be welded 42 is main welded, for example, the part to be welded 43 positioned in the downstream side of the welding direction in the scanning range 18 is preferably tack welded first. By main welding the part to be welded while keeping the parts to be welded positioned on both sides thereof fixed, it is possible to effectively suppress the metallic plates 31 and 32 from being deformed or displaced when the main welding is carried out.

Further, as shown in FIGS. 4A to 4D, it is preferable that the tack welding and the main welding be carried out in the scanning range 18 while moving the scanning means 11. The number of times that the scanning means 11 passes the weld root when the metallic plates 31 and 32 are welded becomes one, whereby the productivity is improved.

Alternatively, the main weld nuggets (main weld nuggets 41b, 42b, etc.) may be successively formed after the tack weld nuggets (tack weld nuggets 41a, 42a etc.) are formed in all the parts to be welded (parts to be welded 41, 42, etc.). In this case, however, the number of times that the scanning means 11 passes the weld root becomes two and the productivity becomes lower.

As described above, in the welding method according to this embodiment, the plurality of tack weld nuggets are provided along the virtual closed curve in the part to be welded. Therefore, even when the main weld nuggets are formed so that the main weld nuggets overlap the tack weld nuggets, it is possible to suppress the deformation of the object to be welded by the presence of other tack weld nuggets and the main weld nugget that has already been formed.

Further, the plurality of main weld nuggets are formed so that the main weld nuggets overlap the plurality of respective tack weld nuggets. Therefore, there is no tack weld nugget left after the main welding is completed. Even if there is a tack weld nugget left, the main weld nugget that is formed to overlap the tack weld nugget prevents the remaining tack weld nugget from being peeled off.

It is therefore possible to suppress deformation of the object to be welded when the main welding is carried out and peeling of the tack welded part after the main welding is carried out.

Second Embodiment

Next, with reference to FIGS. 8A to 8D, a welding method according to a second embodiment will be described.

In the first embodiment, as shown in FIGS. 4A to 4D, the object to be welded is welded while tack welding one part on the downstream of the welding direction with respect to the part to be main welded. On the other hand, in the second embodiment, with reference to FIGS. 8A to 8D, a case in which the object to be welded is welded while tack welding two parts on the downstream of the welding direction with respect to the part to be main welded will be described.

Figure 8A:
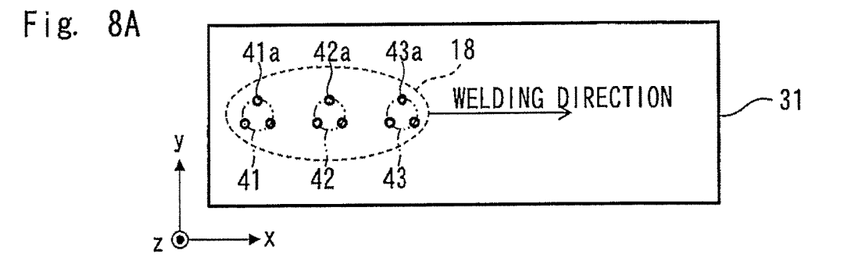
FIGS. 8A to 8D are diagrams for describing a welding method according to a second embodiment.

As shown in FIG. 8A, each of the parts to be welded 41, 42, and 43 is irradiated with the laser beam 16 to perform tack welding. That is, three tack weld nuggets 41a are formed in the part to be welded 41, three tack weld nuggets 42a are formed in the part to be welded 42, and three tack weld nuggets 43a are formed in the part to be welded 43. The order of tack welding the parts to be welded 41, 42, and 43 is not particularly limited.

Figure 8B:
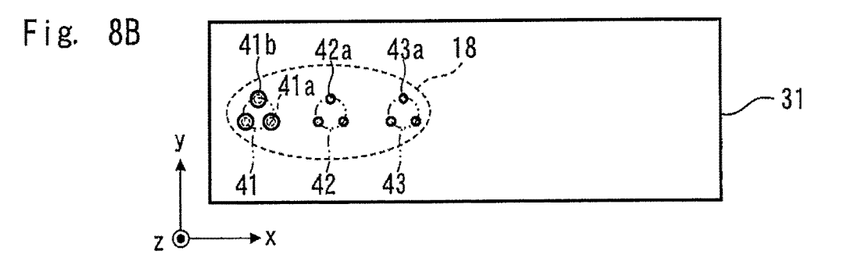

Next, as shown in FIG. 8B, the part to be welded 41 is irradiated with the laser beam 16 to perform main welding. That is, three main weld nuggets 41b are formed so that the main weld nuggets 41b overlap the three respective tack weld nuggets 41a.

Figure 8C:
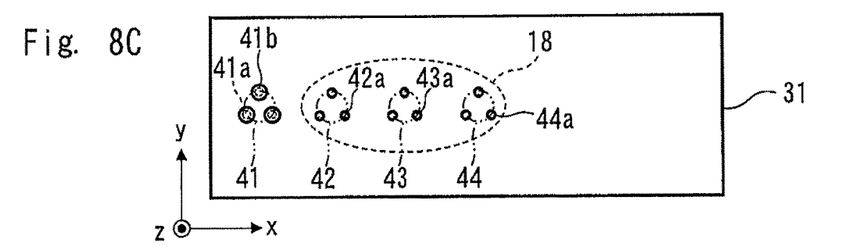

Next, as shown in FIG. 8C, a part to be welded 44 is irradiated with the laser beam 16 to perform tack welding. That is, three tack weld nuggets 44a are formed in the part to be welded 44.

Figure 8D:
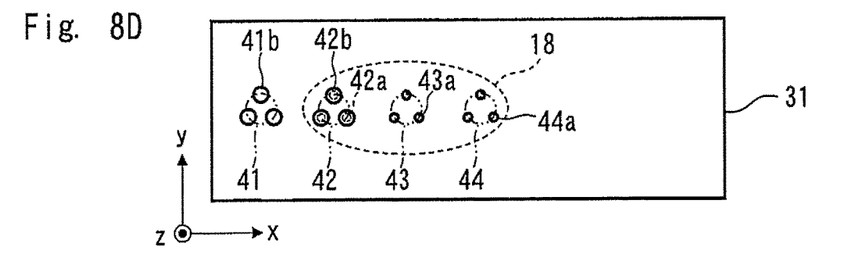

After that, as shown in FIG. 8D, the part to be welded 42 is irradiated with the laser beam 16 to perform main welding. That is, three main weld nuggets 42b are formed so that the main weld nuggets 42b overlap the three respective tack weld nuggets 42a.

By repeating similar operations, the metallic plates 31 and 32 can be welded.

In the welding method according to this embodiment shown in FIGS. 8A to 8D, two parts on the downstream of the welding direction are tack welded with respect to the part to be main welded. Therefore, compared to the welding method according to the first embodiment shown in FIGS. 4A to 4D, it is possible to suppress the deformation or the displacement of the metallic plates 31 and 32 more effectively in this welding method.

While two parts on the downstream of the welding direction are tack welded with respect to the part to be main welded in the welding method according to this embodiment, the number of parts to be tack welded may be three or larger.

EXAMPLE

Figure 9:
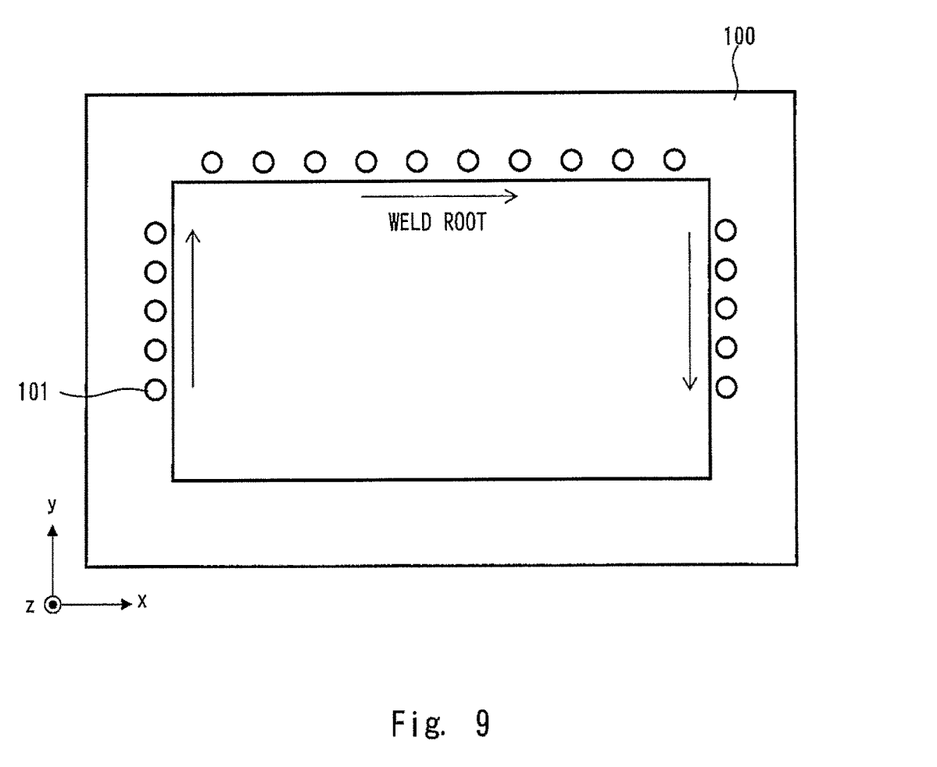
FIG. 9 is a plan view of an object to be welded 100 according to an example.

With reference next to FIG. 9, an example of the present invention will be described. FIG. 9 is a plan view of an object to be welded 100 according to this example.

The object to be welded 100 was welded using the welding method according to the first embodiment. In this example, two frame-shaped 6000 series aluminum alloy plates that are stacked on each other was used as the object to be welded 100. The thicknesses of the respective aluminum alloy plates were 1.2 mm and 0.9 mm. A fiber laser was used as the laser oscillator 10 of the laser welding apparatus 1.

As shown in FIG. 9, the number of parts to be welded 101 in the object to be welded 100 was 20. At this time, as described with reference to FIGS. 4A to 4D, the tack welding and the main welding of the object to be welded 100 were executed in the scanning range 18 while the scanning means 11 was being moved. That is, in this example, the number of times that the scanning means 11 passes the weld root shown by the arrow in FIG. 9 when the object to be welded 100 is welded is one.

As shown in the enlarged view in FIG. 6, three tack weld nuggets having a circular shape and three main weld nuggets having a circular shape were formed in each of the parts to be welded 101. The diameter Da of the tack weld nugget was about 1 mm. Further, the diameter Db of the main weld nugget was about 5 mm.

In this example, as shown in FIGS. 5A to 5C, three main weld nuggets were successively formed in each of the parts to be welded 101 so that the three main weld nuggets overlap the three tack weld nuggets and the three main weld nuggets enclose the three tack weld nuggets. Therefore, there is no tack weld nugget left after the main welding is completed, which means no peeling occurred in the tack welded part after the main welding was carried out.

Further, since the three tack weld nuggets were provided in each of the parts to be welded 101, as described with reference to FIGS. 5A to 5C, it is possible to suppress deformation of the object to be welded due to the presence of other tack weld nuggets and the main weld nugget that has already been formed when the main weld nugget is formed.

In summary, in this example, it is possible to suppress deformation of the object to be welded when the main welding is carried out and to suppress peeling of the tack welded part after the main welding is carried out.

The present invention is not limited to the above embodiments and may be changed as appropriate without departing from the spirit of the present invention.

For example, the nuggets of the part to be welded may have a desired shape. The nuggets may be, for example, C-shaped, O-shaped, or linearly-shaped.

Further, the welding method according to the present invention can be widely applied to welding using a high energy beam such as a laser beam, an electron beam, and an ion beam (e.g., hybrid laser-arc welding, electron beam welding).

Further, the tack welding and the main welding may be carried out using a plurality of scanning means. Since the plurality of laser beams are used in this case, the welding speed can be increased.

Further, while the welding method according to the present invention is particularly suitable for an aluminum alloy plate, which tends to be easily deformed when welding is carried out, it can be also applied to a steel plate or another metallic plate.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A welding method for irradiating an object to be welded comprising a plurality of metallic plates that are stacked on each other with a high energy beam and performing welding, the method comprising the processes of:
    forming a plurality of tack weld nuggets along a virtual closed curve on a part to be welded of the object to be welded; and
    forming a plurality of main weld nuggets so that the main weld nuggets overlap the plurality of respective tack weld nuggets.

2. The welding method according to claim 1, wherein the plurality of main weld nuggets are formed so that the plurality of main weld nuggets enclose the plurality of respective tack weld nuggets.

3. The welding method according to claim 1, wherein a laser beam is used as the high energy beam.

4. The welding method according to claim 2, wherein a laser beam is used as the high energy beam.

* * * * *